Oct. 20, 1970

W. F. GALEY 3,535,100

PROCESS FOR CHANGING DIMENSION OF FLOATING
LIQUID SUPPORTED ON BATH

Filed March 3, 1969

INVENTOR
WILLIAM F. GALEY

BY Chisholm and Spencer

ATTORNEYS

Oct. 20, 1970 W. F. GALEY 3,535,100
PROCESS FOR CHANGING DIMENSION OF FLOATING
LIQUID SUPPORTED ON BATH
Filed March 3, 1969 4 Sheets-Sheet 2

INVENTOR
WILLIAM F. GALEY
BY
Chisholm and Spencer
ATTORNEYS

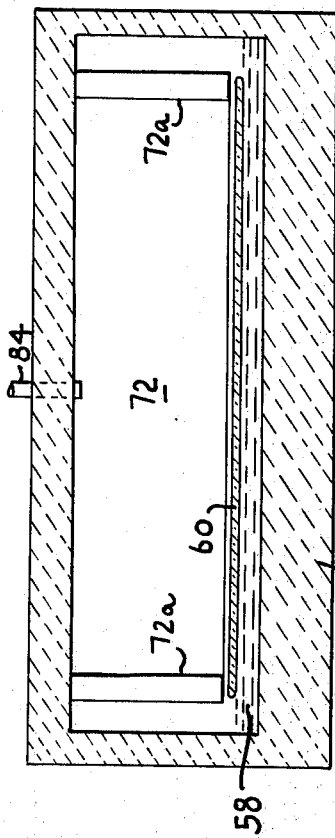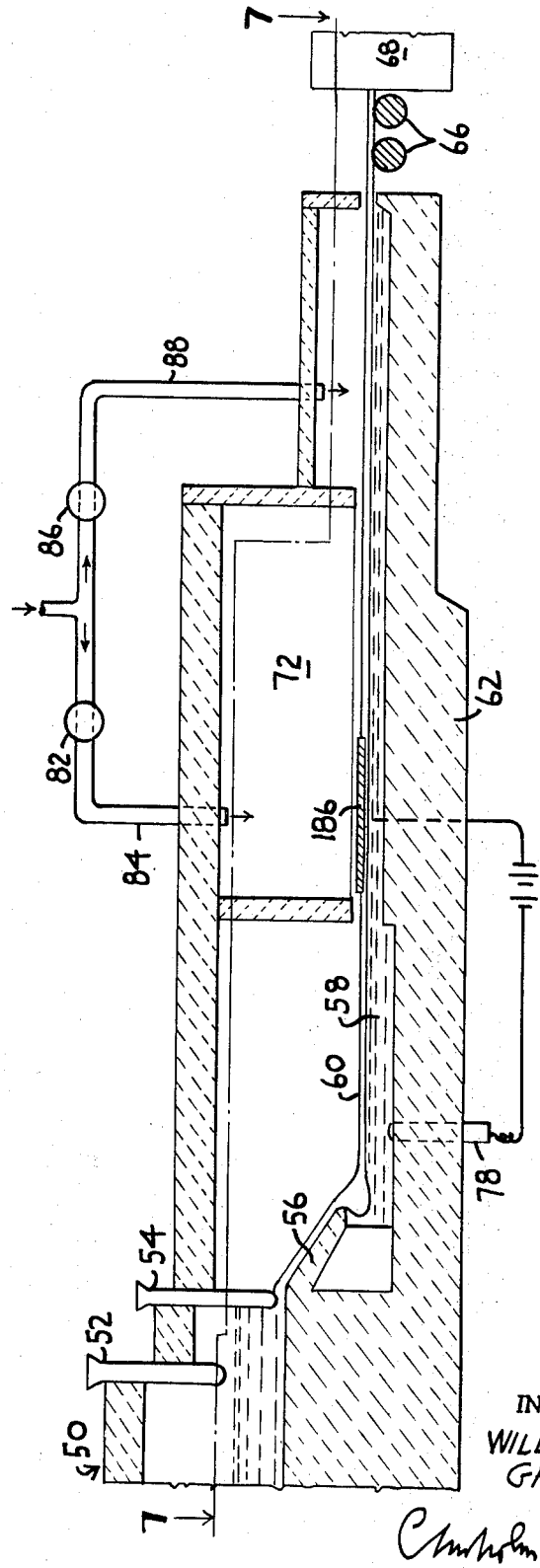

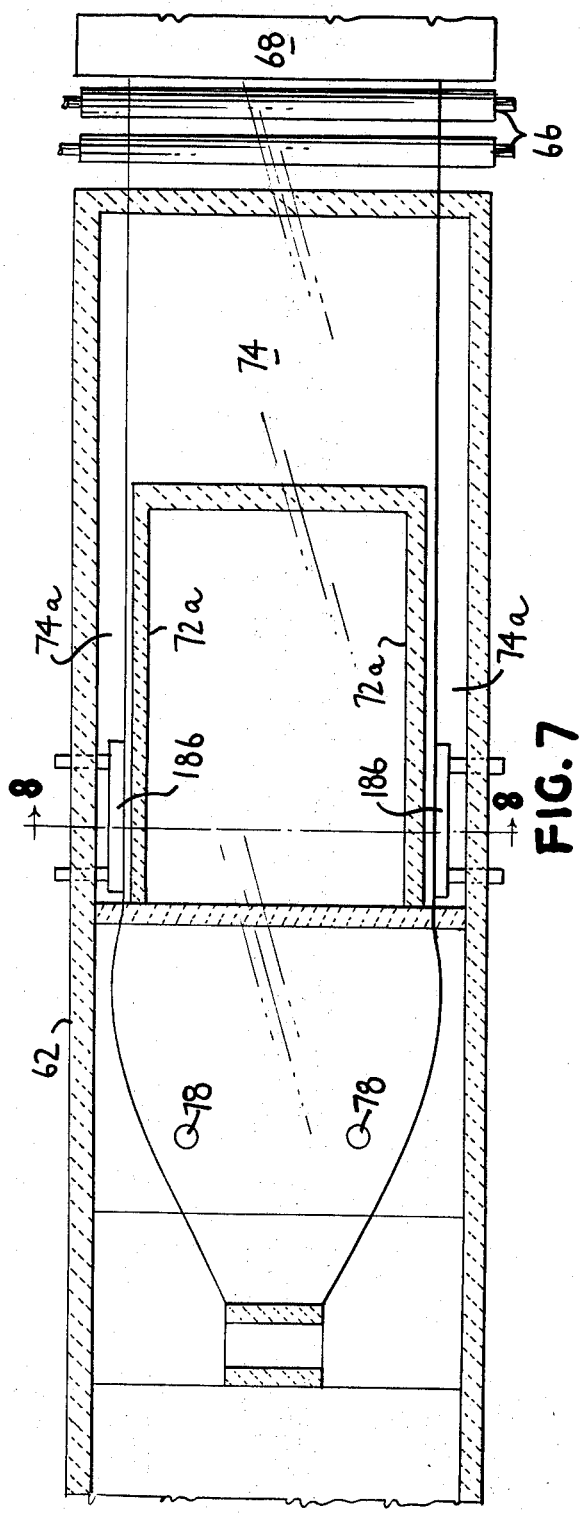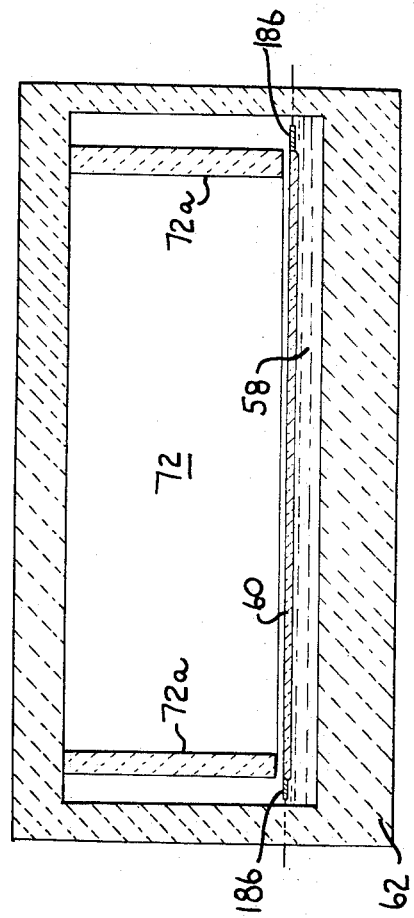

United States Patent Office 3,535,100
Patented Oct. 20, 1970

3,535,100
PROCESS FOR CHANGING DIMENSION OF FLOATING LIQUID SUPPORTED ON BATH
William F. Galey, Saxonburg, Pa., assignor to PPG Industries, Inc., Pittsburgh, Pa., a corporation of Pennsylvania
Continuation-in-part of application Ser. No. 500,083, Oct. 21, 1965. This application Mar. 3, 1969, Ser. No. 803,630
Int. Cl. C03b *13/00, 18/00*
U.S. Cl. 65—99
4 Claims

ABSTRACT OF THE DISCLOSURE

An electrical potential is applied between two electrically conductive immiscible liquids, one floating on the other, to change a dimension of the floating liquid.

---

This application is a continuation-in-part of my copending application, Ser. No. 500,083, filed Oct. 21, 1965, entitled "Novel Method" now abandoned.

This invention relates to the treatment of materials, for example, glass, so that a dimension of the material, as for example, the thickness, may be changed and controlled as desired.

When one liquid is floated on a portion of the surface of a second liquid in certain systems, the liquids being immiscible in one another, and allowed to flow freely, i.e., without confinement, the lighter liquid will come to rest at a certain thickness and, in a static system, will cover a certain area of the surface of the second liquid. This is particularly true of those systems where the sum of the surface tension between the two liquids plus the surface tension between the lighter liquid and the atmosphere over the liquid exceeds the surface tension between the heavier liquid and the atmosphere.

In a dynamic system, where the lighter liquid is caused to flow or is moved forward from a point of discharge over the heavier liquid, the width of the lighter liquid can be established by controlling the rate of flow of the first liquid on the second liquid such that the thickness reaches the thickness which ultimately is reached in the static system for the same liquids. The thickness of the lighter liquid will stabilize at a specific value when it is allowed to flow freely over the surface of the heavier liquid under ordinary atmospheric conditions and without confinement, i.e., without engagement of confining walls or recourse to other confining or controlling precautions. This thickness will be hereinafter referred to as the "equilibrium thickness."

According to this invention it has been discovered that the thickness of the floating liquid can be modified from the equilibrium thickness and controlled by applying and maintaining an electrical potential difference between the two liquids. In the static system above described, at certain potentials the floating liquid will cover a different area of the supporting liquid when the thickness of the floating liquid is thus changed by changing the potential difference between the liquids, the liquid spreading if the thickness is reduced, and vice versa. A change in thickness of the floating liquid is almost instantaneous upon application of the electrical potential when the viscosity of the floating liquid is relatively low and stabilizes or comes to an apparent equilibrium at another value, the magnitude of which depends upon the magnitude of the potential difference.

The invention finds particular use in the treatment of glass wherein molten glass is floated on a portion of the surface of a bath of molten tin, the process being known as the "float process." Molten glass when so supported and permitted to flow unhindered and to an equilibrium thickness will attain a thickness of approximately one-fourth inch. Quarter-inch glass finds many uses in industry, but there is a growing demand for thin glass on the order of one-eighth inch or less in thickness. Also, there is some demand for thicker glass.

Heretofore, such thinner float glass has been produced commercially by attenuation of the glass after it reaches equilibrium thickness. Attenuation lowers the optical quality of the product because of unequal cooling and thus produces rib formation across the ribbon of glass. Commercial methods for producing thicker float glass do not appear to have been developed. The present invention provides a convenient method for adjusting the thickness to the desired value.

To more fully understand the invention, reference is now made to the accompanying drawings, in which:

FIG. 5 is a sectional view taken on line 5—5 of FIG. 3;

FIG. 6 is a longitudinal section similar to FIG. 3, illustrating another embodiment of glass manufacturing equipment;

FIG. 7 is a sectional view taken on line 7—7 of FIG. 6; and

FIG. 8 is a sectional view taken on line 8—8 of FIG. 7.

Figure 1:
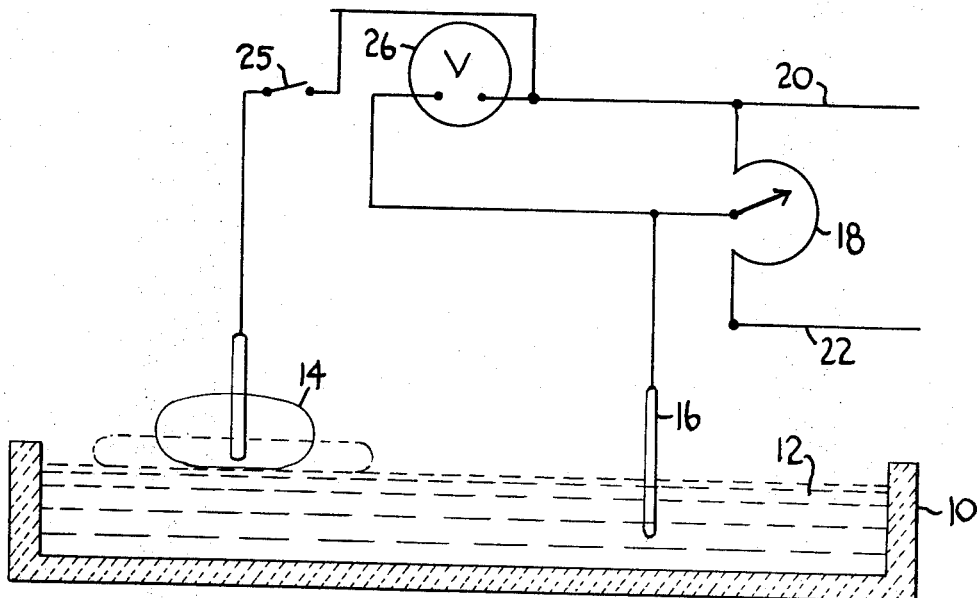
FIG. 1 is a sectional diagrammatic view illustrating a typical arrangement for practicing the invention.

Turning to FIG. 1, there is shown a container 10 having therein a liquid 12 on which is floating another liquid 14 with a density less than that of the liquid 12. When necessary or desirable, a cover (not shown) may be provided over the container to enclose or retain an inert atmosphere above the liquids 12 and 14, which atmosphere may be a partial or substantially full vacuum or may be a nonreactive gas. The liquids are immiscible one with the other.

An electrode 16 is disposed in the liquid 12 and is connected to a rheostat 18 which in turn is connected across bus bars 20 and 22. The bus bars 20 and 22 are connected to a suitable source of DC voltage. Another electrode 24 is disposed in the liquid 14 and is connected, through a switch 25, to the bus bar 20. A voltmeter 26 is provided to determine the voltage of the circuit and the variable rheostat 18 is provided in the circuit by the aforegoing means for applying an electrical potential to the conductive liquids 12 and 14 to vary the voltage, so as to control the thickness of the liquid material 14.

When the electric potential is applied, the thickness of liquid material 14 changes and at certain potential, it spreads out and becomes thinner, as indicated by the broken lines in FIG. 1.

Figure 2:
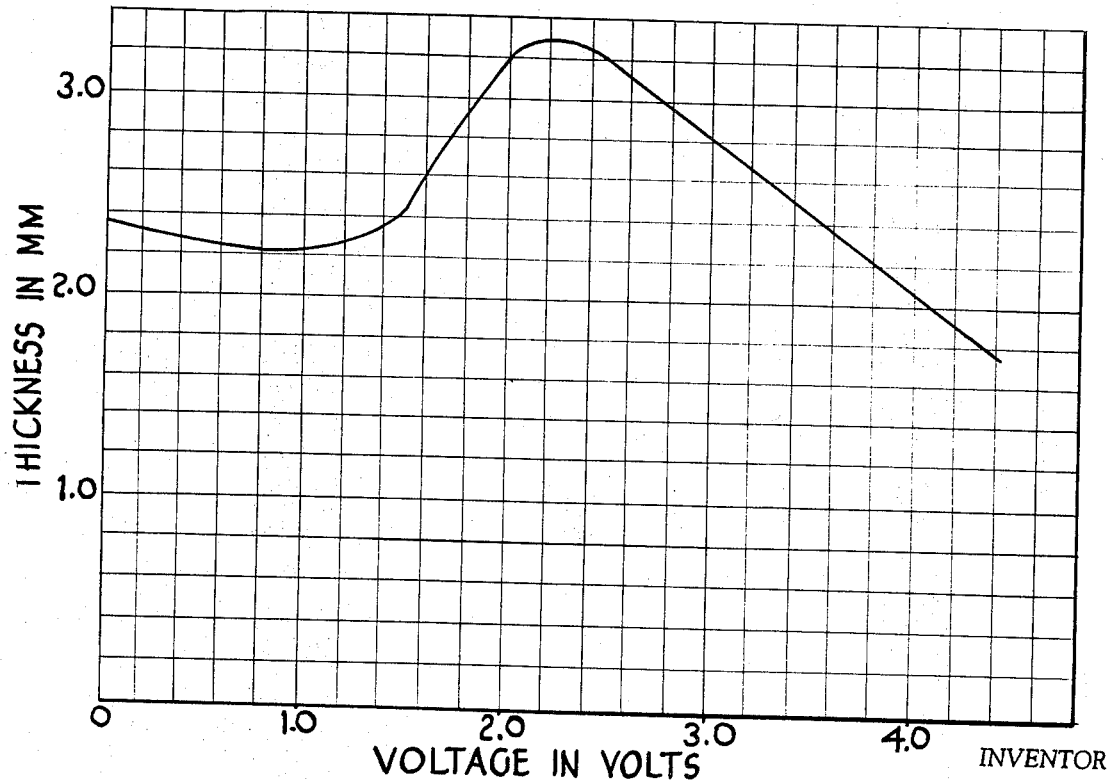
FIG. 2 is a curve of thickness plotted against voltage, illustrating how the thickness of a floating liquid changes as voltage is changed between the floating liquid and the liquid upon which it is resting.

FIG. 2 is a typical curve of voltage and thickness of a liquid material 14, showing that as voltage is increased, thickness of the liquid changes.

When glass is used as the floating liquid, a suitable supporting liquid is tin. Heat must be applied to the glass and tin to maintain the glass molten, so that it can flow, and to the tin to maintain it in molten condition.

EXAMPLE I

A 10-milliliter quantity of a 0.05 Normal NaCl solution (NaCl in distilled water) was placed on a pool of mercury and permitted to assume its equilibrium thickness by flowing unhindered until it came to rest on a central area of the mercury and spaced from any confining walls. The surface of the solution and the uncovered part of the mercury was exposed to ordinary air atmosphere. The temperature was about 25° C. The equilibrium thickness was calculated by measuring the diameter of the solution and using the formula $V = \pi r^2 h$, where $V$=volume, $r$=radius of the body of solution and $h$=thickness of the body, and was determined to be 2.26 millimeters.

A carbon electrode was placed into the body of mercury and another carbon electrode was placed within the solution floating on the mercury. The latter electrode was small enough in diameter so that it had little influence (when immersed) upon the diameter of the solution on the mercury. The electrodes were connected to a suitable, variable source of DC current, connecting the electrode immersed into the solution to the positive pole of the DC source, and a potential was applied therebetween. Immediately, a change in thickness of the solution was observed. When 4.0 volts potential was applied, the diameter of the solution was measured and the thickness was calculated to be 2.02 millimeters. Other potentials were applied and the thickness of the solution was calculated for each voltage. The following table sets out the thicknesses, calculated as above, for the applied, measured potentials:

| Voltage: | Thickness (millimeters) |
| --- | --- |
| 0 | 2.32 |
| 0.5 | 2.24 |
| 1.0 | 2.20 |
| 1.5 | 2.39 |
| 2.0 | 3.16 |
| 2.2 | 3.24 (maximum) |
| 2.5 | 3.16 |
| 3.0 | 2.76 |
| 3.5 | 2.36 |
| 4.0 | 2.02 |
| 4.4 | 1.76 |

It will be understood that an electric potential is established naturally between the mercury and the sodium chloride solution, the mercury being positive with respect to the solution. The magnitude of this voltage is not great enough to cause electrolysis to take place at the interface.

By imposing a positive external potential upon the pole or electrode immersed in the solution, the potential difference or voltage between the mercury and the solution gradually decreases to zero at about 2.2 imposed volts when the solution achieved its maximum thickness. Thereafter, further increase in voltage caused a fall in thickness, even below the initial thickness, as the solution becomes more positive than the mercury.

As a general rule, voltages are held low enough so that little or no electrolysis takes place at the interface. Thus, where one of the liquids is metallic, as in the case of mercury, it of course can serve as an electrode and electrolytic reactions can take place across the interface between the liquids and, because the solution is an electrolyte, electrolysis can occur if the voltage is above the decomposition voltage of the system or the electrolyte and, in any event, some current will tend to flow if the voltage tends to exceed the polarization voltage and overvoltage of the system.

As a general rule the voltage is held low enough so that little or even no current tends to flow across the interface, because the imposed voltage either reduces the natural electromotive force created at the interface toward zero or to an opposite sign of magnitude so low that it does not overcome the back electromotive force generated by polarization phenomena or overvoltage phenomena which vary with the electrode composition as, for example, with the composition of mercury amalgam. Imposed voltages below about 3 to 5 volts, usually above 0.1 volt, are operative, the exact tolerable voltage depending upon the relative composition of the liquids.

Usually it is desirable to impose the voltage by an inert electrode inserted in or contacting the solution. Typical electrodes may be platinum, carbon, molybdenum, gold or like materials which are not appreciably attacked by the solution.

In the application of this process to different liquids, it is first desirable to determine the respective polarity of the heavy and the light liquids and to make a general determination of the magnitude of the potential difference between them. This may be done effectively by inserting a pole or electrode in each liquid and measuring the electromotive force between the poles in substantially the same way that the potential difference of an electrolytic cell of unknown potential is generally measured as, for example, by use of a voltmeter.

According to another method, a working battery may be connected to opposite ends of a slide wire resistance of a Wheatstone bridge. One of the poles, which are immersed in the two liquids, may then be connected to the slide wire and the other pole connected in series with a galvanometer to one end of the bridge. By moving the slide wire along the bridge, a point in the bridge can then be located where no current flow takes place. By repeating this procedure, replacing the poles by a battery or cell of known E.M.F., the magnitude of the electric potential between the liquids is determined by comparison.

For most purposes, the polarity of the electromotive force applied to the liquids is opposite to that which naturally is established between the liquids. In that case, where a thinner layer of the lighter liquid is desired, the imposed potential should be high enough to reverse the relative polarities of the liquid. This enables a substantial change in electrical relationships between the layers without substantial current flow.

Where substantial flow of current need not be prevented, however, or where the desired adjustment in thickness is low, the process may be conducted by applying a voltage of the same, rather than opposite, polarity to the poles mentioned above.

It is to be understood that this invention is especially applicable to the case where the liquids in question are solids at normal temperature (25° C.) but are in molten state in the course of the operation. For example, a common method of producing glass is to deposit it in molten state upon molten tin and thereby to cast a ribbon which is withdrawn from the point of deposit and ultimately is removed as a continuous ribbon from the tin and cooled to room temperature. This process is described in the following typical U.S. Pats.: 789,911; 1,489,823; 2,968,892, and 3,083,551, as well as Belgian Pats. 567,339; 582,512; 598,157; 601,088, and 619,242.

It has been found that in the process described in these patents, notably in U.S. 3,083,551, the glass disposes itself on the tin to produce a ribbon which, if unattenuated, reaches an equilibrium thickness. By attenuation of the glass, the thickness can be thinned to some degree. However, this creates problems and reduces the yield of satisfactory glass.

According to this invention, this process may be conducted to obtain different thicknesses of glass by changing the natural potential between the glass and the tin. Thus, an external electric potential may be applied between the glass and the tin to reduce or enlarge or change the relative polarity of these two molten liquids.

Figure 3:
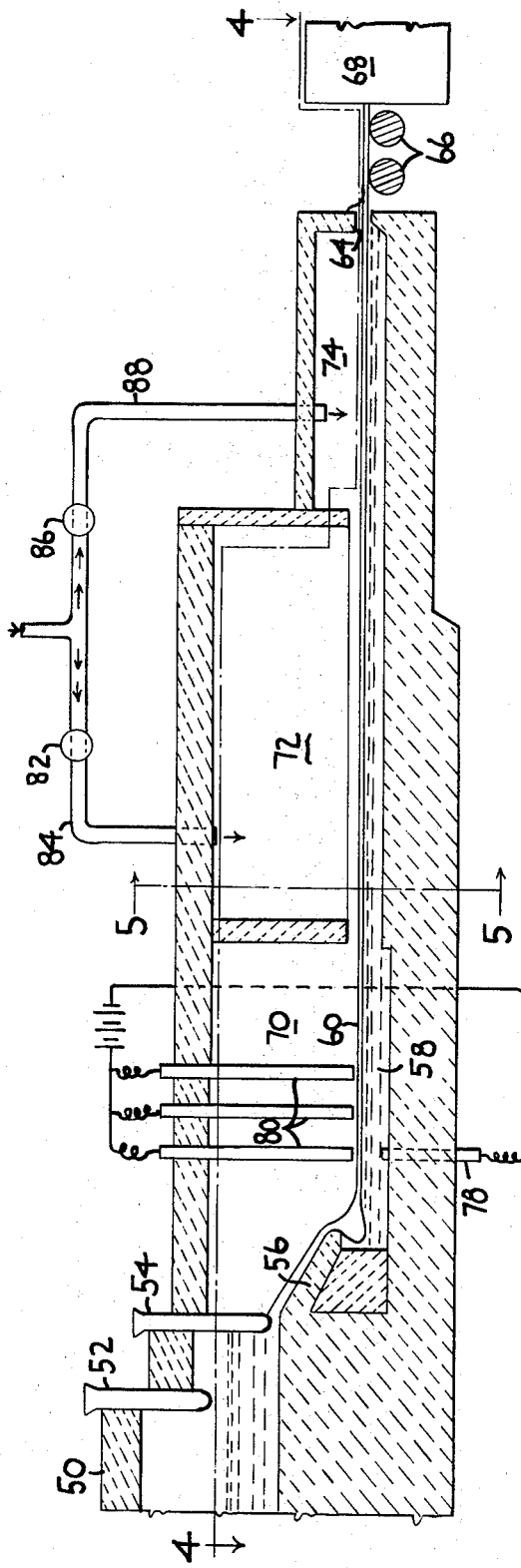
FIG. 3 is a longitudinal section of an apparatus for performing the process of this invention, illustrating one embodiment of glass manufacturing equipment.
Figure 4:
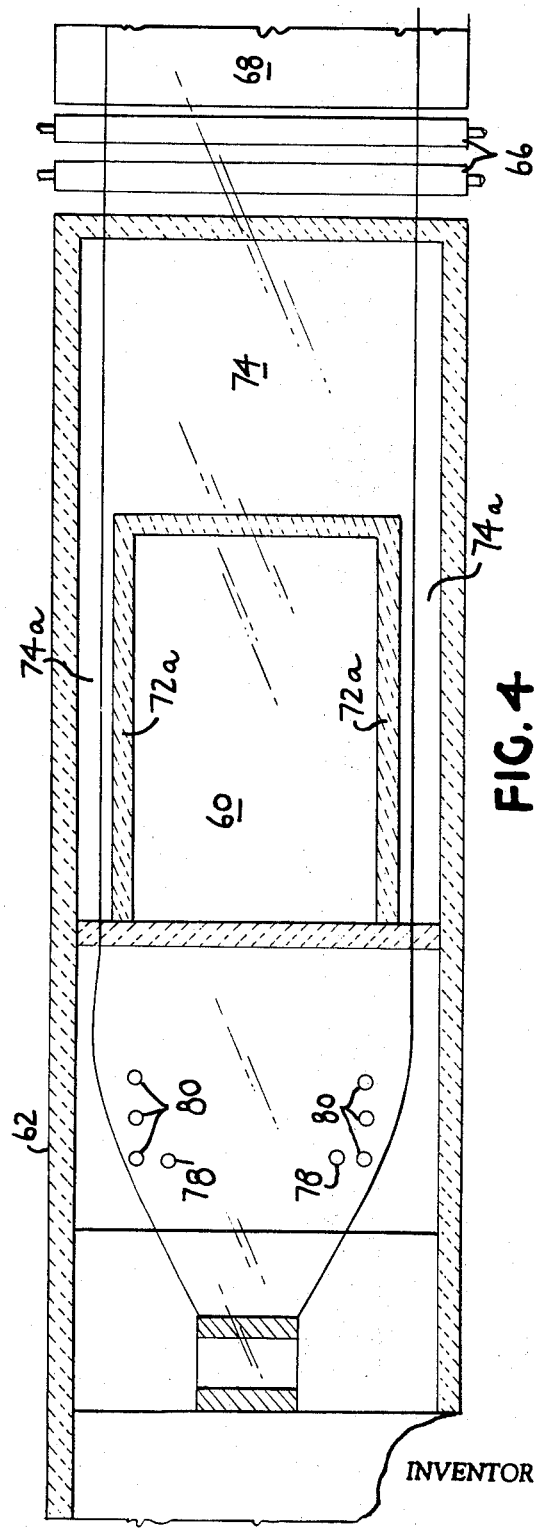
FIG. 4 is a sectional view taken on line 4—4 of FIG. 3.

Attention is now directed to FIGS. 3 to 5, inclusive, which illustrate one embodiment of this invention for sizing glass in ribbon form to a particular thickness and thereafter maintaining the width substantially uniform. In the embodiment illustrated, molten glass from a melting tank 50 flows through adjustable tweels 52 and 54 over a spout 56 and onto the surface of a pool of immiscible liquid 58, such as molten tin or tin alloy, so as to form a ribbon 60 of the glass. The liquid 58 is contained within an enclosed refractory and electrically nonconductive or isolated tank 62 having an exit 64 through which the ribbon 60 is conveyed by rolls 66 into an annealing lehr 68 of conventional construction.

The refractory tank 62 is divided by transverse walls into a first section 70, a second section 72 having side walls 72a inwardly of the exterior walls of the tank and within the edges of the glass ribbon, and a third section 74, the latter appearing as U-shaped in plan (see FIG. 4) with outer walls providing spaces 74a outside walls 72a. In the first section of the tank, the glass is sized to its desired thickness; in the second section of the tank, the glass is held at the desired thickness while cooling and the glass is further cooled in the third section of the tank, so that it can be handled, without damage to its surfaces by the conveyor rolls 66.

To size the glass in the first section 70 of the tank 62, there are provided means to establish an electrical potential between the glass and the supporting liquid. The means to establish an electrical potential between the glass and the supporting liquid includes one or more electrodes 78 extending upwardly into the supporting liquid, for example, through a side or bottom wall of the chamber, and one or more electrodes 80 extending downwardly into or in contact with the glass. They are suitably connected to a source of direct current power in any conventional manner such as, for example, that shown in FIG. 1 of the drawings. Also, the electrodes may be disposed differently than illustrated, as long as they extend into the liquids or are in electrical contact therewith. By imposing a voltage opposite in charge to the natural potential between the tin and the glass, it is possible to raise the voltage until the glass reaches the desired thickness, which rises to a maximum as the voltage rises and then falls to a lower level even below the initial thickness with continued voltage increase.

By applying a positive charge to the electrodes 80 in contact with the glass (i.e., making the tin effectively a cathode in the system with the electrodes 80 as anodes), it is possible to reduce or even eliminate migration of tin into the glass surface and/or to eliminate or reduce formation of bloom in the glass. Bloom is a surface defect commonly present in the under side of float glass, which manifests itself, when severe, as a white haze or imperfection on the glass surface.

At all events, the effect of the applied electric potential is to change the thickness of the glass, i.e., to "size" it to the desired degree.

The glass as it is sized moves along the bath 58 and the central area thereof, inwardly of its edges, moves into the second section 72 wherein the glass is held at the desired thickness while allowed to progressively cool to its discharge into the section 74. While no electrodes are shown in this area, they may be provided in the same way as in the first section 70. In this way, the previously established glass thickness may be maintained while cooling. However, since it can be difficult to maintain electrical contact with the glass, another method may be resorted to.

The molten glass, as is known, when permitted to flow unhindered on a bath of molten tin, will seek an equilibrium thickness, namely, approximately one-fourth inch. To hold the glass to its desired and established thickness while the glass cools to a temperature at which it will not flow, the second section 72 may be a chamber in which a higher or lower pressure is maintained.

In accordance with the teaching in the co-pending application of Edmund R. Michalik, Ser. No. 251,682, filed Jan. 15, 1963, entitled "Manufacture of Glass" (the disclosure of which is incorporated herein by reference), it is possible to change the equilibrium thickness of glass by applying a pressure to a portion of glass inwardly of its edges which is different from the pressure on the supporting liquid outside of and in contact with the glass. Thus, a pressurized gas is fed into the section 72 from a source, through a valve 82 and a pipe 84. Gas at a different pressure is fed from the source through a valve 86 and a pipe 88 into the U-shaped section 74. Thus, when it is desired to hold the thickness of glass which has been presized by the electric potential to a thickness less than equilibrium thickness, the pressure within the section 72 is greater than the pressure within the section 74. The pressures are reversed when glass thickness of greater than equilibrium thickness is to be maintained. The gas is chosen to be inert so as to prevent oxidization of the liquid of the bath and may also be fed into the first section 70 of the tank if necessary or desirable. The glass extends outwardly beyond walls 72a into the legs 74a of the chamber 74a so that the edges thereof are subjected to a pressure different from that within chamber 72.

Because no heat is added to the glass in the tank section 72, the temperature thereof gradually decreases during its passage therethrough and the glass becomes set therein to its formed dimensions of thickness and width.

The glass further cools in the tank section 74 so that it can be removed therefrom and conveyed through the annealing lehr 68.

As diagrammatically illustrated in FIG. 6, electrodes 186 may be disposed above and along part or all of the edges of the ribbon so as to contact the glass. In such a case, the electrodes normally will be disposed to avoid contact with the tin so as to avoid short circuit between the electrodes 186 and the metal.

While tin has been mentioned as the molten metal upon which the glass is disposed, the invention is similarly applicable to other molten metals which can be used to support the glass, such as are mentioned in the above patents.

The electrodes 80, in actual contact with the glass, may be placed in the spout area so as to readily establish the electrical contact with the glass without abrading the flat glass being produced.

While in general it is desirable to hold the impressed voltage below that at which substantial current flows, it is also possible to utilize higher voltages. In this case, some electrolysis can take place and a small amount of metallic sodium or other alkali or alkaline earth metal will tend to form at the metal glass interface, which can keep the metal surface essentially free from oxide.

Although the present invention has been described with reference to specific details of certain embodiments thereof, it is not intended that such details shall be regarded as limitations upon the scope of this invention except insofar as included in the accompanying claims.

I claim:

1. The process of changing a dimension of an electrically conductive liquid selected from the group consisting of salt solutions and molten glass, comprising supporting said electrically conductive liquid upon a different supporting conductive media that is immiscible with said electrically conductive liquid so that a continuous interface is provided between said electrically conductive liquid and said supporting media and said electrically conductive liquid has at least one free edge, contacting said electrically conductive liquid with a means for applying an electrical potential thereto, contacting said supporting electrically conducting media with another means for applying an electrical potential thereto, and applying an electrical potential to said means greater than the natural potential existing between said electrically conductive liquid and said supporting media and sufficient to change a dimension of said electrically conductive liquid.

2. The process of claim 1 wherein said applied electrical potential is sufficient to change the thickness dimension of said electrically conductive liquid.

3. The process of claim 2 wherein said electrically conductive liquid is molten glass and said supporting electrically conductive media is molten tin.

4. The process of claim 3 wherein said applied electrical potential is sufficient to change the thickness dimension of said molten glass, cooling said molten glass while its thickness is changed until it ceases to flow and removing the cooled glass of changed thickness from said molten tin.

References Cited

UNITED STATES PATENTS

| | | |
|---|---|---|
| 1,997,263 | 4/1935 | Meissner. |
| 3,242,060 | 3/1966 | Leclerc. |
| 3,174,919 | 3/1965 | Spremulli. |

FOREIGN PATENTS

| | | |
|---|---|---|
| 1,368,838 | 6/1964 | France. |

FRANK W. MIGA, Primary Examiner

U.S. Cl. X.R.

65—182, 93, 40